United States Patent
Tanabe et al.

(10) Patent No.: US 9,588,501 B2
(45) Date of Patent: Mar. 7, 2017

(54) SERVOMOTOR CONTROL DEVICE

(71) Applicant: FANUC CORPORATION, Yamanashi (JP)

(72) Inventors: Yoshikiyo Tanabe, Yamanashi (JP); Yoshiki Hashimoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/978,026

(22) Filed: Dec. 22, 2015

(65) Prior Publication Data

US 2016/0187860 A1    Jun. 30, 2016

(30) Foreign Application Priority Data

Dec. 26, 2014    (JP) .................................. 2014-266739

(51) Int. Cl.
     *H02P 3/00*      (2006.01)
     *G05B 9/02*      (2006.01)
     *H02P 27/08*      (2006.01)
     *H02P 29/02*      (2016.01)

(52) U.S. Cl.
     CPC ................ *G05B 9/02* (2013.01); *H02P 27/08* (2013.01); *H02P 29/024* (2013.01)

(58) Field of Classification Search
     CPC ... G05B 11/28; H02P 3/00; H02P 3/18; H02P 3/22; H02P 8/28; H02P 8/30; H02P 8/34; H02P 3/10; H02P 3/20; H02P 25/00; H02P 27/00; H02P 27/04; H02K 7/102; H02K 7/104; H02K 7/106
     USPC ..... 318/560, 561, 625, 599, 400.01, 400.14, 318/120, 269, 270, 271, 272, 273, 274, 318/275, 277, 279, 430, 445, 799, 800, (Continued)

(56) References Cited

U.S. PATENT DOCUMENTS

| | | | |
|---|---|---|---|
| 5,170,118 A | 12/1992 | Schumacher | |
| 8,803,458 B2 * | 8/2014 | Horikoshi | H02P 3/22 318/400.01 |
| 8,868,989 B2 | 10/2014 | Jindal et al. | |

FOREIGN PATENT DOCUMENTS

| | | |
|---|---|---|
| EP | 2568560 A1 | 3/2013 |
| JP | 61081188 A | 4/1986 |
| JP | H6509934 A | 11/1994 |

(Continued)

OTHER PUBLICATIONS

English Abstract for European Publication No. 2568560 A1, published Mar. 13, 2013, 1 pg.

(Continued)

*Primary Examiner* — Antony M Paul (74) *Attorney, Agent, or Firm* — Fredrikson & Byron, P.A.

(57) ABSTRACT

The servomotor control device includes: an inverter circuit that drives a servomotor; a PWM circuit that outputs a PWM signal to the inverter circuit; a cutoff circuit that receives a safety signal and the PWM signal, outputs the PWM signal to the inverter circuit when the safely signal is turned on, and does not output the PWM signal when the safely signal is turned off; and a servomotor control circuit that outputs the safety signal to the cutoff circuit and receives a monitor signal output from the cutoff circuit, the servomotor control circuit turning off, within one cycle time of the PWM signal, the safety signal input to the cutoff circuit where the PWM signal is turned off during servomotor drive and detecting an abnormality when an off state is not detected using the monitor signal.

6 Claims, 9 Drawing Sheets

(58) Field of Classification Search
USPC ..... 318/801; 363/40, 44, 95, 120, 21.1, 174, 363/175
See application file for complete search history.

(56) References Cited

FOREIGN PATENT DOCUMENTS

| | | |
|---|---|---|
| JP | 2004237416 A | 8/2004 |
| JP | 2011182535 A | 9/2011 |
| JP | 201327231 A | 2/2013 |

OTHER PUBLICATIONS

English Abstract for Japanese Publication No. 2013-027231 A, published Feb. 4, 2013, 1 pg.
English Abstract for Japanese Publication No. JPH06-509934 A, published Nov. 2, 1994, 1 pg.
English Translation of Abstract for Japanese Publication No. 2011182535, published Sep. 15, 2011, 1 page.
English Translation of Abstract for Japanese Publication No. 61081188, published Apr. 24, 1986, 1 page.
English Abstract and Machine Translation for Japanese Publication No. 2004-237416 A, published Aug. 26, 2004, 28 pgs.

\* cited by examiner

INVERTER CIRCUIT

OPERATION DESCRIPTION OF INVERTER CIRCUIT

| | 1 | 2 | 3 | 4 | 5 | 6 | 7 | 8 | 9 | 10 | 11 | 12 |
|---|---|---|---|---|---|---|---|---|---|---|---|---|
| U1 | ON | ON | ON | ON | ON | ON | | | | | | |
| V1 | | | | | ON | ON | ON | ON | ON | ON | | |
| W1 | ON | ON | | | | | | | ON | ON | ON | ON |
| U2 | | | | | | | ON | ON | ON | ON | ON | ON |
| V2 | ON | ON | ON | ON | | | | | | | ON | ON |
| W2 | | | ON | ON | ON | ON | ON | ON | | | | |

SERVOMOTOR CONTROL DEVICE

BACKGROUND ART

1. Field of the Invention

The present invention relates to a servomotor control device, and specifically to a servomotor control device that enables a power cutoff circuit to be periodically tested during servomotor operation.

2. Description of the Related Art

For an emergency stop circuit included in a servomotor control device, a duplexed circuit is used to enhance safety, as disclosed in, for example, Japanese Laid-open Patent Publication No. 2004-237416. However, even in such a duplexed circuit, it is possible that a single failure may occur, which may lead to a multiple failure in a long-term continuous operation. Specifically, in an emergency stop circuit including a semiconductor element, it is highly possible that a short circuit failure in an output may occur due to an accident such as a temporary overvoltage and a short circuit or an accidental component fault, and therefore it is necessary to periodically test the emergency stop circuit in a short period of time.

Therefore, an emergency stop circuit including a semiconductor element is duplexed, and further a method for confirming periodically in a short period of time that the emergency stop circuit normally operates using a test pulse is used. In this case, it is possible to early detect a single failure of the emergency stop circuit and to safely stop the circuit using a circuit operating properly before a multiple failure occurs.

Figure 1:
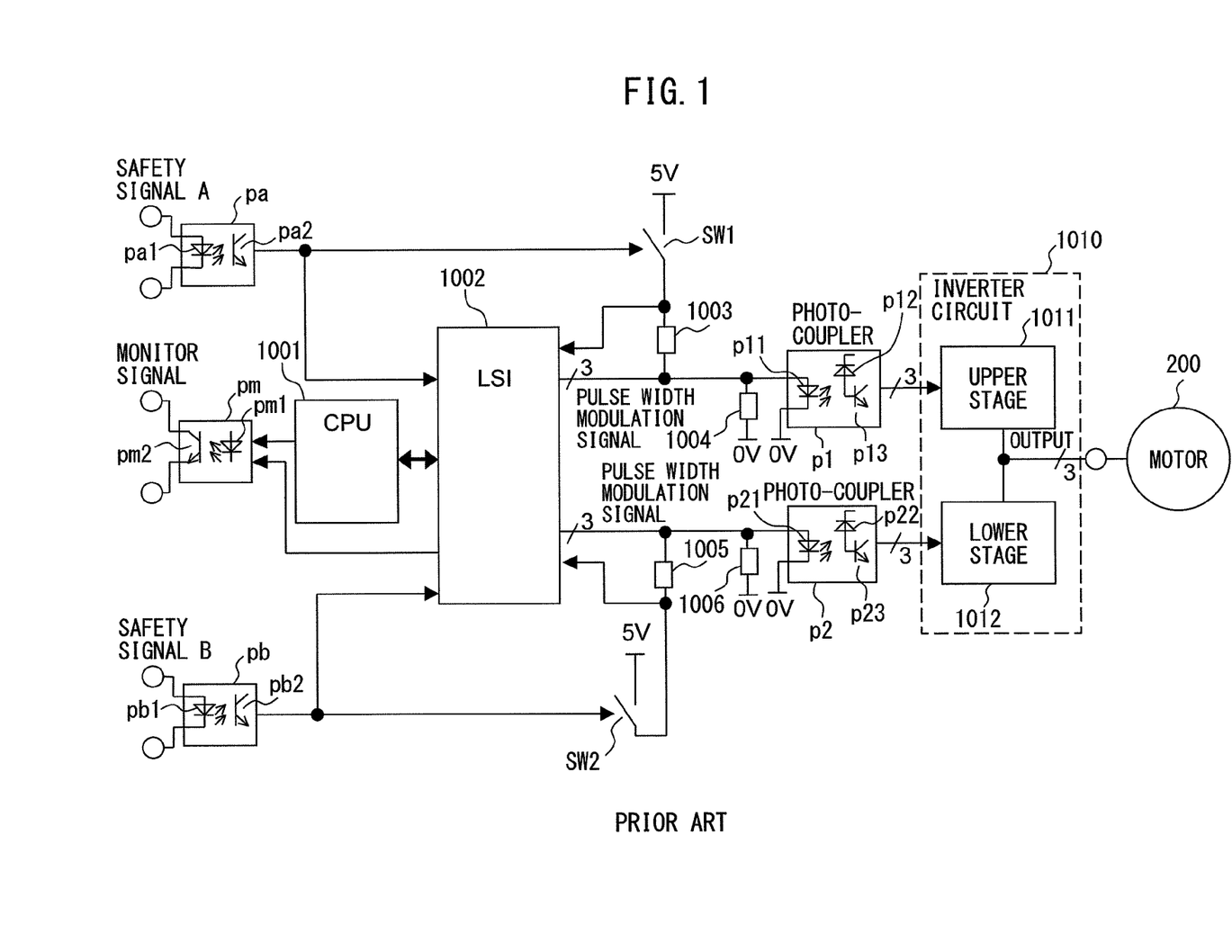
FIG. 1 is a configuration diagram of a conventional power cutoff circuit.

On the other hand, a method for safely performing a power cutoff of a servo amplifier using a semiconductor element used for motor power signals of the servo amplifier has been devised. FIG. 1 illustrates a conventional power cutoff circuit. The conventional power cutoff circuit includes a first photo-coupler pa that outputs a safety signal A, a second photo-coupler pb that outputs a safety signal B, a third photo-coupler pm that receives a monitor signal, a CPU 1001 that transmits the monitor signal to the third photo-coupler pm, an LSI 1002 that receives the safety signals A and B, a first switch SW1, a second switch SW2, an inverter circuit 1010 that drives a servomotor 200, a fourth photo-coupler p1 that controls an upper-stage semiconductor element 1011 of the inverter circuit 1010, and a fifth photo-coupler p2 that controls a lower-stage semiconductor element 1012 of the inverter circuit 1010. The reference signs 1003 to 1006 each represent a resistor. In the respective photo-couplers, the reference signs pa1, pm1, pb1, p11, and p21 each represent a light emitting element, and pa2, pm2, pb2, p13, and p23 each represent a light receiving element. The fourth photo-coupler p1 and the fifth photo-coupler p2 include diodes p12 and p22, respectively.

In this method, the safety signals A and B are input as an external signal that is not a pulse signal and is asynchronous with PWM (pulse width modulation) control. Therefore, it is necessary to perform a test of power cutoff circuit while PWM control is turned off, i.e., the servomotor 200 is stopped.

When it is possible to test a power cutoff circuit during servomotor operation, a failure of the power cutoff circuit can be early detected, and thereby a risk of a multiple failure is reduced and the reliability of a power cutoff circuit including a semiconductor element is enhanced.

SUMMARY OF THE INVENTION

An object of the present invention is to provide a servomotor control device that enables a power cutoff circuit to be periodically tested during PWM control, i.e., servomotor operation.

A servomotor control device according to one embodiment of the present invention includes: an inverter circuit that drives a servomotor by converting direct current to alternate current and supplying the alternate current obtained by the conversion to the servomotor; a pulse width modulation circuit that outputs a pulse width modulation signal to the inverter circuit; a cutoff circuit that receives a safety signal and the pulse width modulation signal, outputs the pulse width modulation signal to the inverter circuit when the safety signal is turned on, and does not output the pulse width modulation signal to the inverter circuit when the safety signal is turned off; and a servomotor control circuit that outputs the safety signal to the cutoff circuit and receives a monitor signal output from the cutoff circuit, the servomotor control circuit turning off, within one cycle time of the pulse width modulation signal, the safety signal input to the cutoff circuit where the pulse width modulation signal is turned off during servomotor drive and detecting an abnormality when an off state is not detected using the monitor signal.

BRIEF DESCRIPTION OF THE DRAWINGS

Objects, features, and advantages of the present invention will be further apparent by the description of the following embodiments associated with accompanying drawings, in which.

DESCRIPTION OF THE EMBODIMENTS

With reference to the accompanying drawings, the servomotor control device according to the present invention will be described below.

First Embodiment

Figure 2:
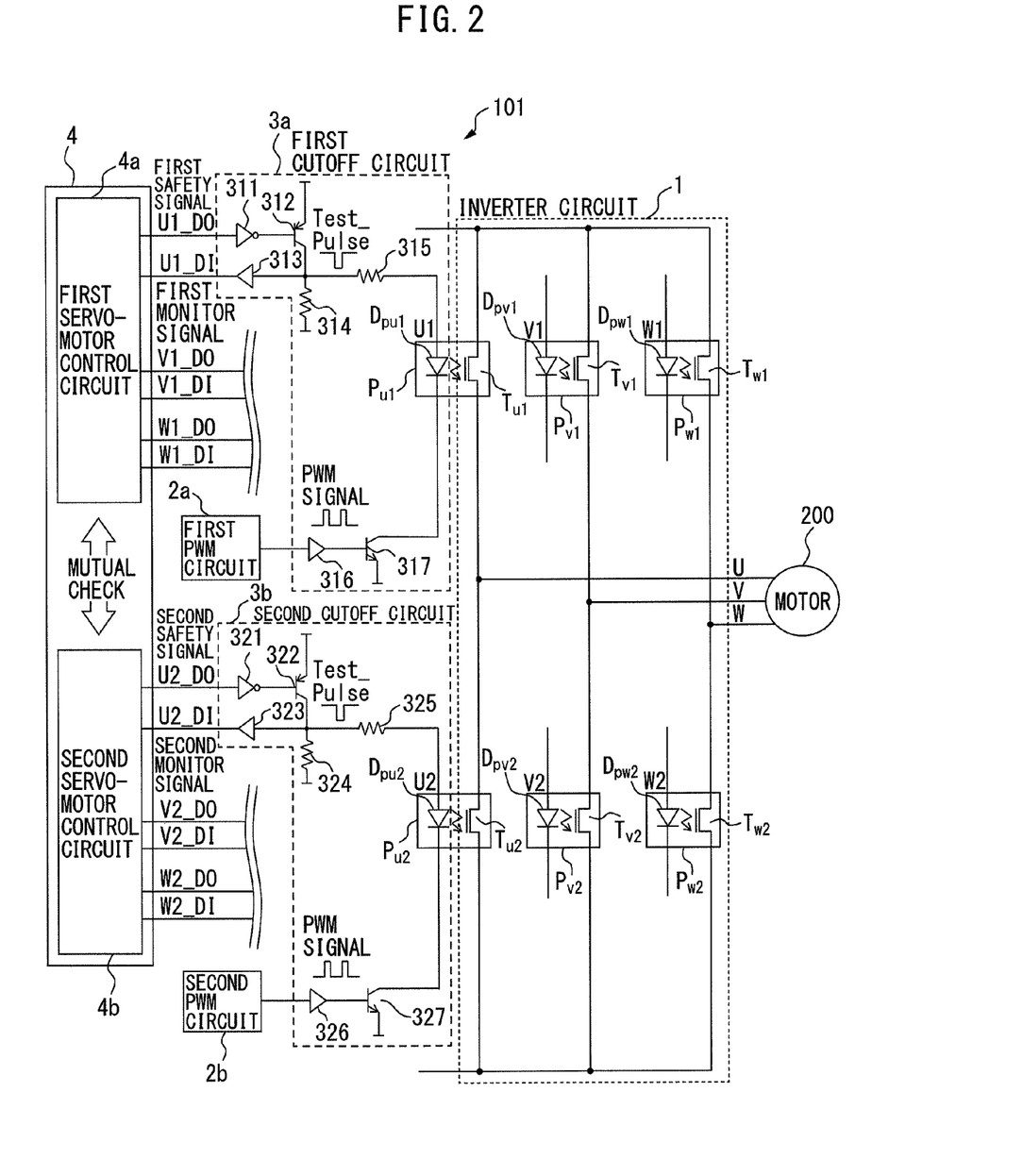
FIG. 2 is a configuration diagram of a servomotor control device according to a first embodiment of the present invention.

Initially, a servomotor control device according to a first embodiment of the present invention is described below. FIG. 2 is a configuration diagram of the servomotor control device according to the first embodiment of the present invention. A servomotor control device 101 according to the first embodiment of the present invention includes: an inverter circuit 1 that drives a servomotor 200 by converting direct current to alternate current and supplying the alternate current obtained by the conversion to the servomotor; pulse width modulation circuits 2a and 2b that output a pulse width modulation signal to the inverter circuit 1; cutoff circuits 3a and 3b that receive a safety signal and the pulse width modulation signal, output the pulse width modulation signal to the inverter circuit 1 when the safety signal is turned on, and do not output the pulse width modulation signal to the inverter circuit 1 when the safely signal is turned off; and a servomotor control circuit 4 that outputs the safety signal to the cutoff circuit and receives a monitor signal output from the cutoff circuit, the servomotor control circuit 4 turning off, within one cycle time of the pulse width modulation signal, the safety signal input to the cutoff circuit where the pulse width modulation signal is turned off during drive of the servomotor 200 and detecting an abnormality when it is difficult to detect an off state using the monitor signal.

Further, the servomotor control device 101 according to the first embodiment of the present invention may include: a plurality of the cutoff circuits 3a and 3b; and a plurality of the safety signals input to the plurality of the cutoff circuits, respectively, a plurality of the pulse width modulation signals input to the plurality of the cutoff circuits, respectively, and a plurality of monitor signals output from the cutoff circuits, respectively, wherein the servomotor control circuit 4, when detecting the abnormality, stops the servomotor 200 by turning off outputs of the safety signals to all of the cutoff circuits 3a and 3b.

The inverter circuit 1 includes a U-phase upper-arm semiconductor element Tu1, a U-phase lower-arm semiconductor element Tu2, a V-phase upper-arm semiconductor element Tv1, a V-phase lower-arm semiconductor element Tv2, a W-phase upper-arm semiconductor element Tw1, and a W-phase lower-arm semiconductor element Tw2.

A first cutoff circuit 3a includes photo-couplers Pu1, Pv1, and Pw1 for detecting whether the upper-stage (upper-arm) semiconductor elements Tu1, Tv1, and Tw1 of the inverter circuit 1 normally operate, respectively. The photo-couplers include light emitting elements Dpu1, Dpv1, and Dpw1, respectively. Further, the first cutoff circuit 3a includes semiconductor elements 312 and 317, digital input/output elements 311, 313, and 316, and resistors 314 and 315.

A second cutoff circuit 3b includes photo-couplers Pu2, Pv2, and Pw2 for detecting whether the lower-stage (lower-arm) semiconductor elements Tu2, Tv2, and Tw2 of the inverter circuit 1 normally operate, respectively. The photo-couplers include light emitting elements Dpu2, Dpv2, and Dpw2, respectively. Further, the second cutoff circuit 3b includes semiconductor elements 322 and 327, digital input/output elements 321, 323, and 326, and resistors 324 and 325.

The servomotor control circuit 4 includes a first servomotor control circuit 4a and a second servomotor control circuit 4b. The first servomotor control circuit 4a transmits first safety signals U1_DO, V1_DO, and W1_DO of a U phase, a V phase, and a W phase, respectively, to the first cutoff circuit 3a and receives first monitor signals U1_DI, V1_DI, and W1_DI of the U phase, the V phase, and the W phase, respectively, from the first cutoff circuit 3a. The second servomotor control circuit 4b transmits second safety signals U2_DO, V2_DO, and W2_DO of the U phase, the V phase, and the W phase, respectively, to the second cutoff circuit 3b and receives second monitor signals U2_DI, V2_DI, and W2_DI of the U phase, the V phase, and the W phase, respectively, from the second cutoff circuit 3b.

A first PWM circuit 2a transmits a PWM signal to the first cutoff circuit 3a, and a second PWM circuit 2b transmits a PWM signal to the second cutoff circuit 3b.

A servo amplifier (i.e., the servomotor control device) supplies power to the servomotor 200 using the inverter circuit 1. In other words, when the inverter circuit 1 is cut off, a power cutoff of the servomotor 200 can be realized.

Figure 3A:
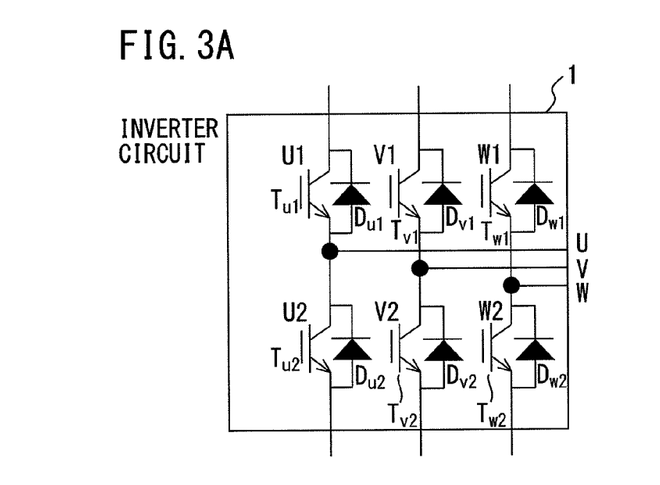
FIG. 3A is a configuration diagram of an inverter circuit used for the servomotor control device according to the first embodiment of the present invention.
Figure 3B:
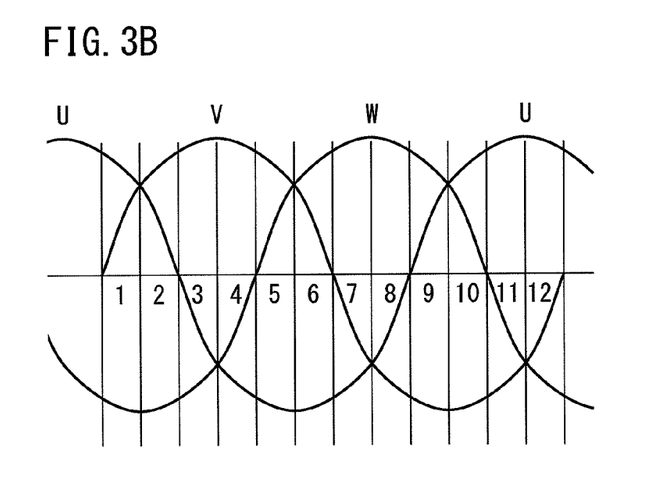
FIG. 3B illustrates voltage waveforms of a U phase, a V phase, and a W phase used for the servomotor control device according to the first embodiment of the present invention.
Figure 3C:
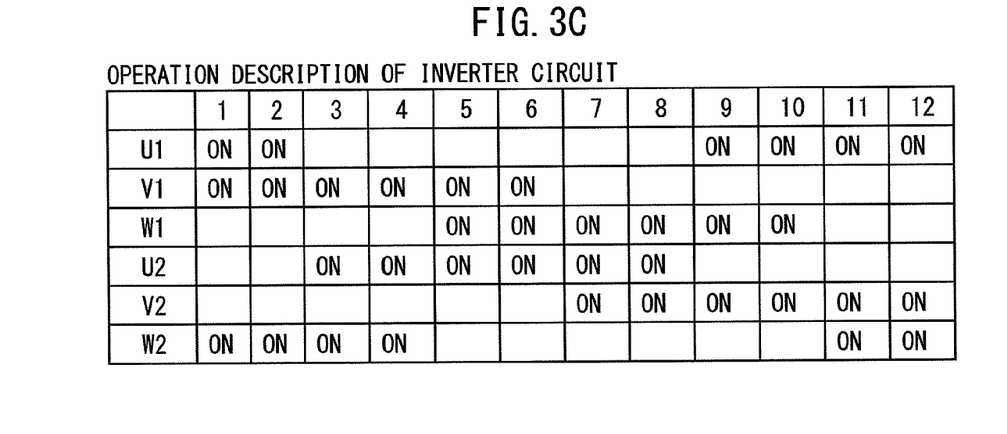
FIG. 3C is a diagram for illustrating an operation of a power element of the inverter circuit used for the servomotor control device according to the first embodiment of the present invention.

An operation of the inverter circuit 1 will be described below with reference to FIG. 3A to FIG. 3C. FIG. 3A is a configuration diagram of an inverter circuit used for the servomotor control device according to the first embodiment of the present invention, FIG. 3B is a diagram for illustrating voltage waveforms of a U phase, a V phase, and a W phase, and FIG. 3C is a diagram for illustrating an operation of a semiconductor element of the inverter circuit. In the inverter circuit 1, three sets of two semiconductor elements (Tu1 and Tu2, Tv1 and Tv2, and Tw1 and Tw2) connected in series to a DC link are connected to each other in parallel. Connection portions of these semiconductor elements (Tu1 and Tu2, Tv1 and Tv2, and Tw1 and Tw2) function as a supply source of a power signal to the servomotor, and there are output signals for three phases that are the U phase, the V phase, and the W phase. The semiconductor elements are connected with diodes Du1, Du2, Dv1, Dv2, Dw1, and Dw2, respectively.

As illustrated in FIG. 3C, when the upper-side semiconductor elements Tu1 (U1), Tv1 (V1), and Tw1 (W1) are turned on, the lower-side semiconductor elements Tu2 (U2), Tv2 (V2), and Tw2 (W2) are definitely turned off, and when the lower-side semiconductor elements are turned on, the upper-side semiconductor elements are turned off. When the upper- and lower-side semiconductors are turned on at the same time, the DC link short-circuits, and therefore the upper- and lower-side semiconductors are not turned on at the same time. In other words, in the inverter circuit, when considered in each of a PWM cycle time, there are a plurality semiconductor elements that are turned off. These semiconductor elements that are turned off are subjected to a test for a cutoff circuit of a semiconductor element.

Figure 4:
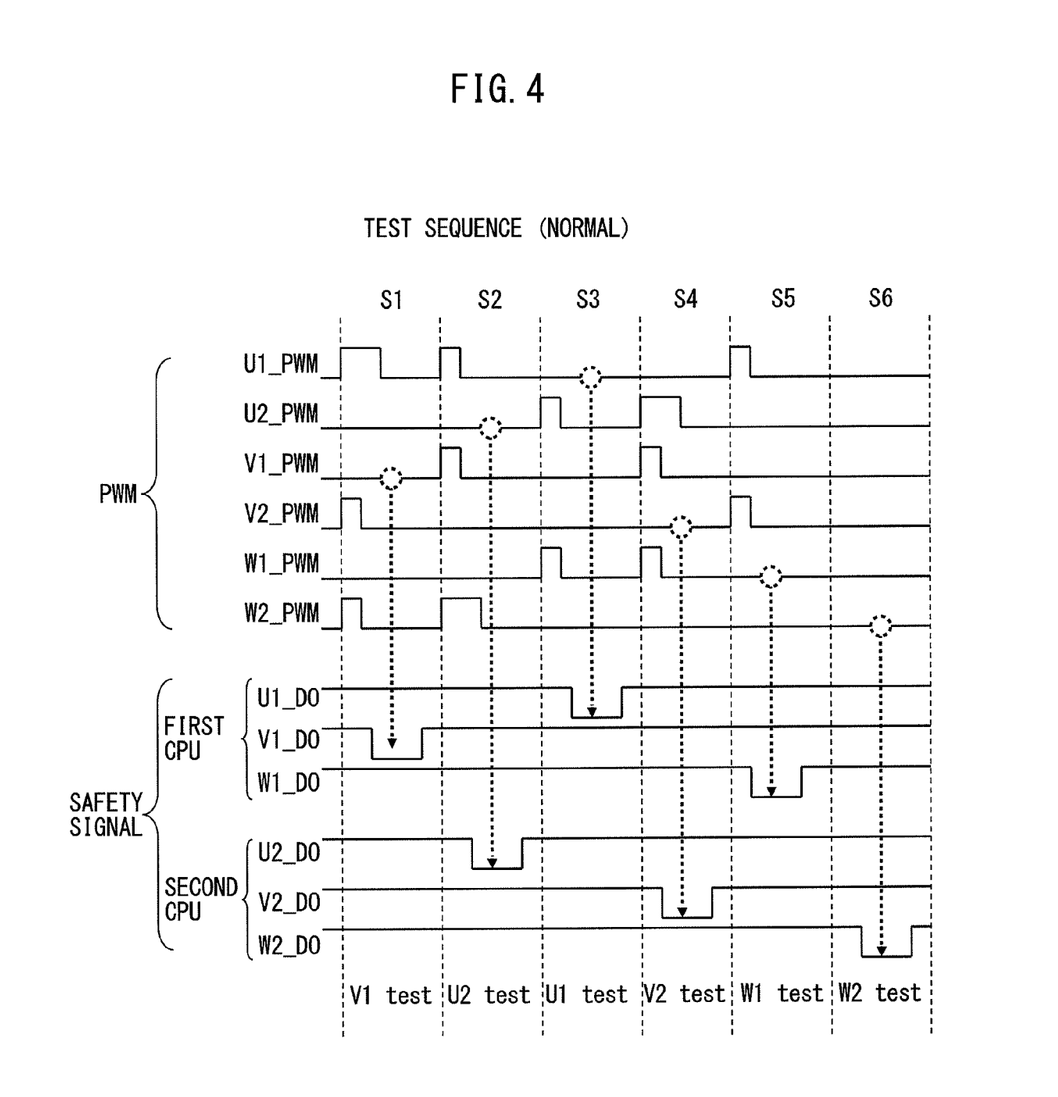
FIG. 4 is a diagram illustrating a test sequence in a normal state in the servomotor control device according to the first embodiment of the present invention.

FIG. 4 illustrates a test sequence in a normal state. FIG. 4 illustrates six PWM signals from U1_PWM to W2_PWM. U1_PWM, V1_PWM, and W1_PWM are output from the first PWM circuit 2a, and U2_PWM, V2_PWM, and W2_PWM are output from the second PWM circuit 2b. Of these, a portion marked with a circle indicates a semiconductor element to be tested. For example, "V1 test" indicates that the V-phase upper-arm semiconductor element Tv1 is tested. For the test, of the six safety signals from U1_DO to W2_DO, a test pulse having a narrow width of at most one cycle time of PWM is output to one semiconductor element where a PWM signal is not turned on, and a test is conducted based on whether the test pulse is correctly read in monitor signals from U1_DI to W2_DI.

The first safety signals of U1_DO, V1_DO, and W1_DO and the first monitor signals of U1_DI, V1_DI, and W1_DI are transmitted to/received by the first servomotor control circuit 4a, and the second safety signals of U2_DO, V2_DO, and W2_DO and the second monitor signals of U2_DI, V2_DI, and W2_DI are transmitted to/received by the second servomotor control circuit 4b (FIG. 2).

In the test sequence of FIG. 4, the first servomotor control circuit 4a and the second servomotor control circuit 4b alternately conduct a test, but it is not necessary to alternately conduct a test. In FIG. 4, regarding the test, one semiconductor element is tested in one cycle, but it is also possible to test two or more semiconductor elements in the same cycle. The servomotor control circuit 4 obtains PWM information from a PWM circuit and specifies a semiconductor element that is not turned on in a PWM cycle time to select a testable semiconductor element.

Figure 5:
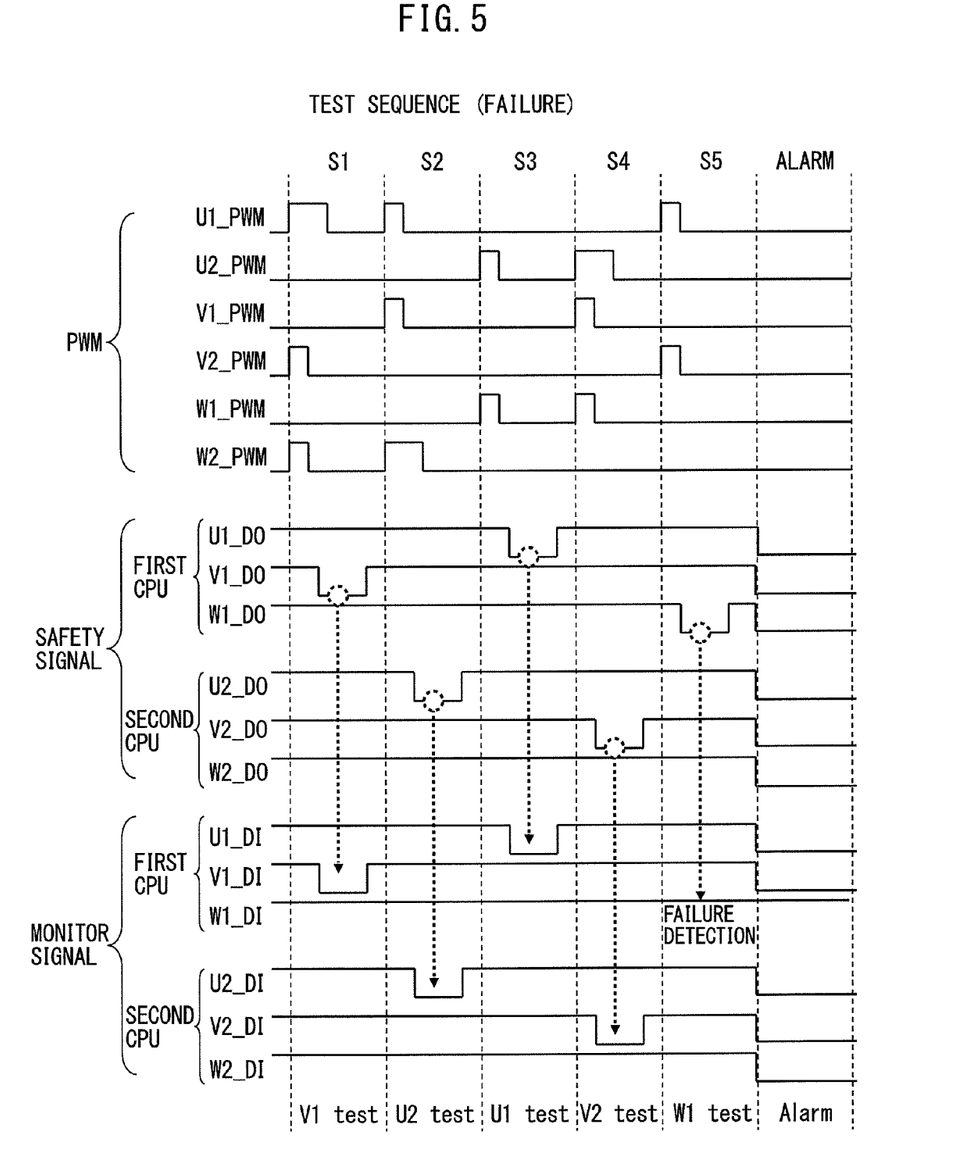
FIG. 5 is a diagram illustrating a test sequence in a failure state in the servomotor control device according to the first embodiment of the present invention.

FIG. 5 illustrates a test sequence in a failure state. When a test pulse is not detected in a monitor signal (FIG. 5), an abnormality of a cutoff circuit is determined, and immediately all of the safely signals and the PWM signals are turned off for an alarm stop.

In this manner, the servomotor control circuit 4 includes the first servomotor control circuit 4a and the second servomotor control circuit 4b, and when it is determined that the first safety signal output by the first servomotor control circuit and the second safety signal output by the second servomotor control circuit are not in the same state for at least one cycle time of a pulse width modulation signal, outputs of the first safety signal and the second safety signal to all of the cutoff circuits are turned off to stop a servomotor.

Figure 6:
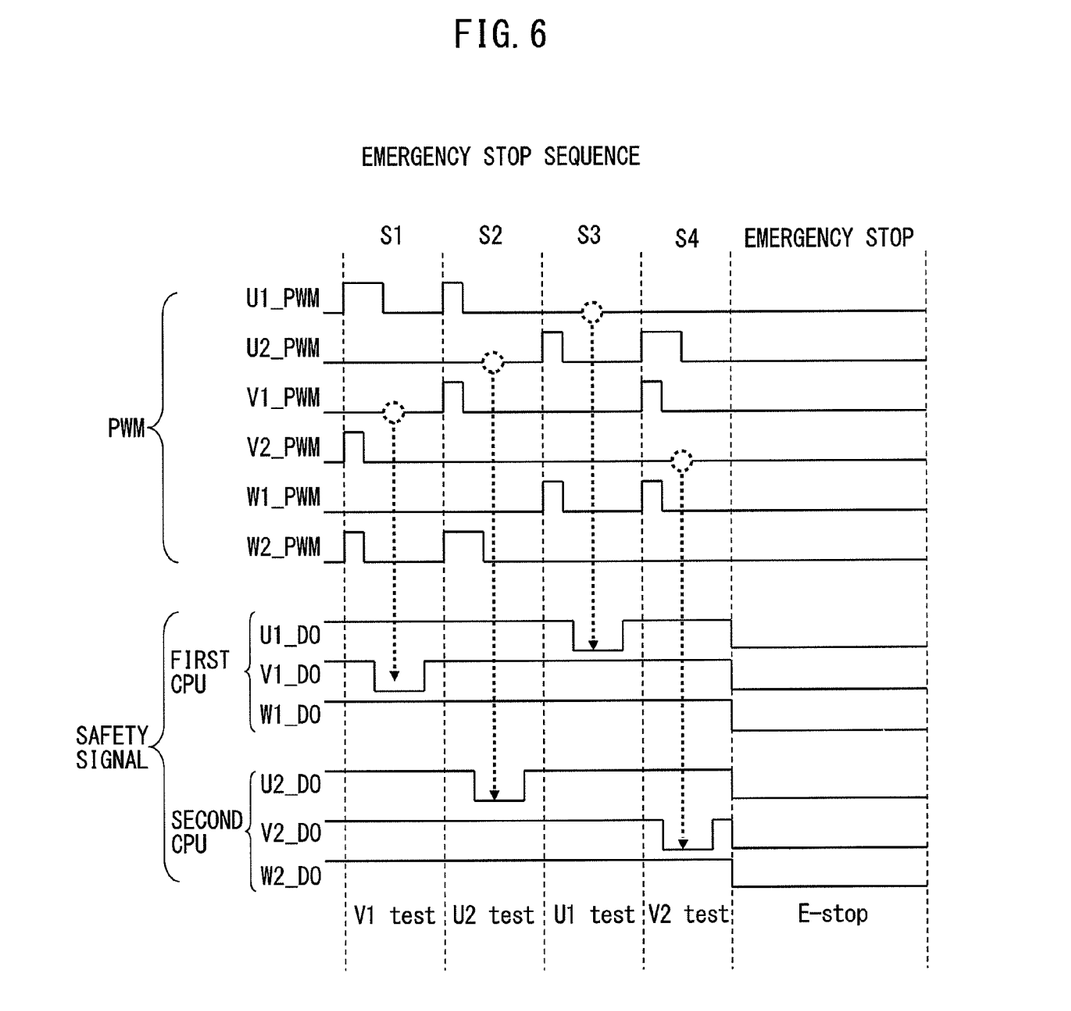
FIG. 6 is a diagram illustrating an emergency stop sequence in the servomotor control device according to the first embodiment of the present invention.

FIG. 6 illustrates a sequence of a power cutoff of a servomotor in an emergency stop state. In the same manner as the alarm generation state in FIG. 5, in the emergency stop state, all of the PWM signals and the safety signals are cut off.

As described above, the servomotor control device according to the first embodiment of the present invention makes it possible to test a power cutoff circuit during servomotor operation, early detect a failure of the power cutoff circuit, and reduce a risk of the occurrence of a multiple failure to enhance the reliability of a power cutoff circuit including a semiconductor element.

Second Embodiment

Figure 7:
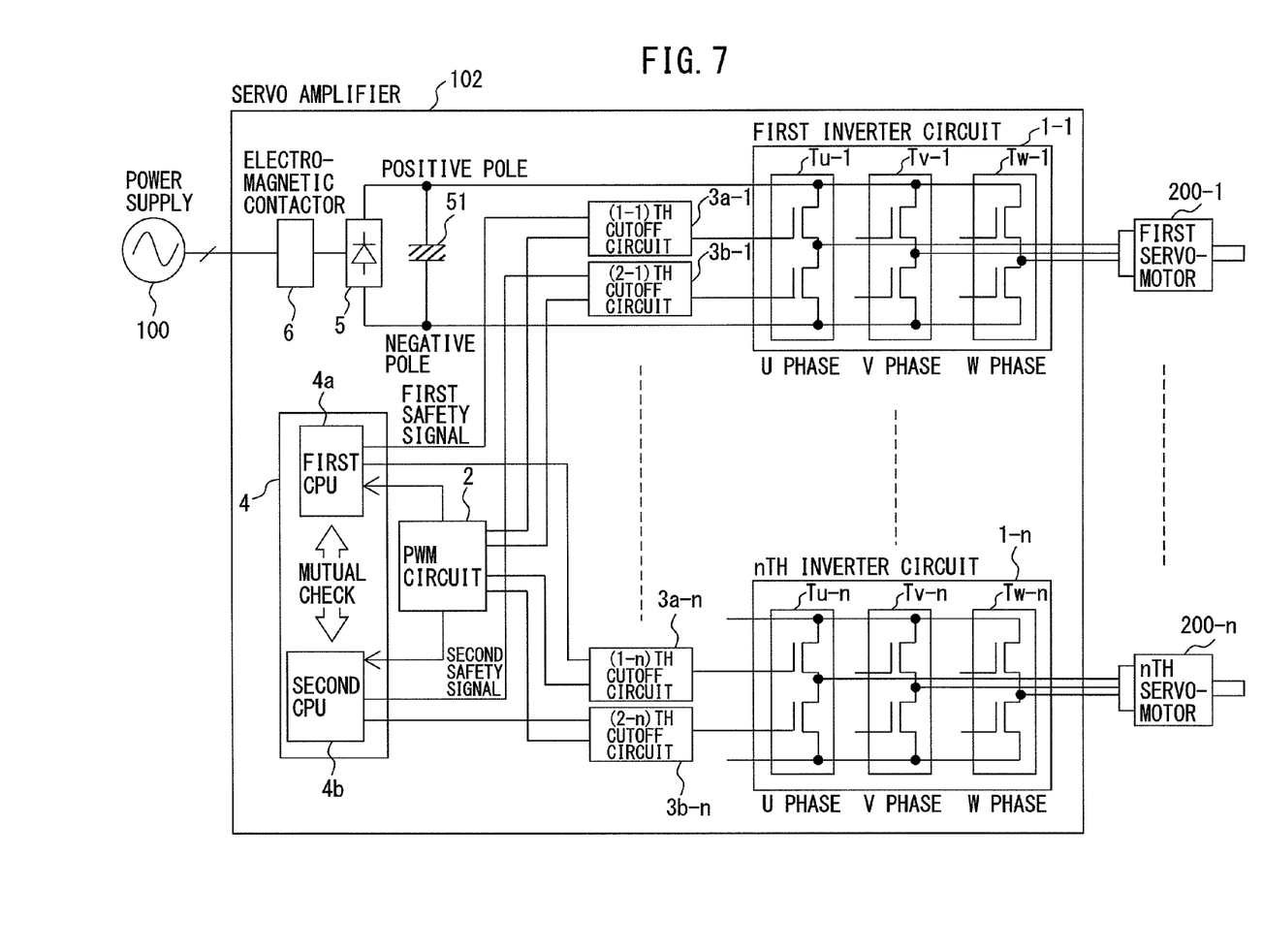
FIG. 7 is a configuration diagram of a servomotor control device according to a second embodiment of the present invention.

Next, a servomotor control device according to a second embodiment of the present invention will be described. FIG. 7 illustrates a configuration diagram of the servomotor control device according to the second embodiment of the present invention. A servomotor control device 102 according to the second embodiment of the present invention includes: a converter 5 that converts alternate current to direct current and supplies the direct current obtained by the conversion to inverter circuits 1-1, . . . , and 1-n; and an electromagnetic contactor 6 including an auxiliary contact that is mechanically interlocked with a main contact that cuts off a connection between a power supply 100 that supplies alternate current to the converter 5 and the converter, wherein the servomotor control circuit 4 detects a state of the auxiliary contact and determines whether the electromagnetic contactor 6 is normal; and turns off outputs of safety signals to all of the cutoff circuits 3a and 3b and cuts off the electromagnetic contactor 6 when detecting an abnormality of the cutoff circuit 3a or 3b, or the electromagnetic contactor 6. The configuration of other components of the servomotor control device 102 according to the second embodiment is substantially the same as the configuration of the servomotor control device 101 according to the first embodiment, and therefore detailed description thereof will be omitted.

The configuration diagram illustrated in FIG. 7 illustrates an example in which the servo amplifier (servomotor control device) 102 according to the second embodiment controls n (n>1) units of servomotors 200-1 to 200-n. Further, the converter 5 includes a DC link capacitor 51. The servomotor control circuit 4 includes a first servomotor control circuit (first CPU) 4a and a second servomotor control circuit (second CPU) 4b. An example in which two PWM circuits separated in the first embodiment are integrated into one PWM circuit 2 is illustrated.

The first servomotor 200-1 is controlled by the first inverter circuit 1-1. The first inverter circuit 1-1 includes a (1-1)th cutoff circuit 3a-1 and a (2-1)th cutoff circuit 3b-1. The (1-1)th cutoff circuit 3a-1 performs transmission/reception of a first safety signal to/from the first CPU 4a and performs transmission/reception of a PWM signal to/from the PWM circuit 2. The (2-1)th cutoff circuit 3b-1 performs transmission/reception of a second safety signal to/from the second CPU 4b and performs transmission/reception of a PWM signal to/from the PWM circuit 2.

The first inverter circuit 1-1 includes two semiconductor elements Tu-1 for a U phase, two semiconductor elements Tv-1 for a V phase, and two semiconductor elements Tw-1 for a W phase.

The nth servomotor 200-n is controlled by the nth inverter circuit 1-n. The nth inverter circuit 1-n includes a (1-n)th cutoff circuit 3a-n and a (2-n)th cutoff circuit 3b-n. The (1-n)th cutoff circuit 3a-n performs transmission/reception of a first safety signal to/from the first CPU 4a and performs transmission/reception of a PWM signal to/from the PWM circuit 2. The (2-n)th cutoff circuit 3b-n performs transmission/reception of a second safety signal to/from the second CPU 4b and performs transmission/reception of a PWM signal to/from the PWM circuit 2.

The first inverter circuit 1-n includes two semiconductor elements Tu-n for the U phase, two semiconductor elements Tv-n for the V phase, and two semiconductor elements Tw-n for the W phase.

The electromagnetic contactor 6 is disposed between the power supply 100 and the converter 5.

The servomotor control device according to the second embodiment of the present invention makes it possible to further enhance reliability by disposing the electromagnetic contactor 6 in a power supply source and cutting off these at the same time at an alarm detection time.

Third Embodiment

Figure 8:
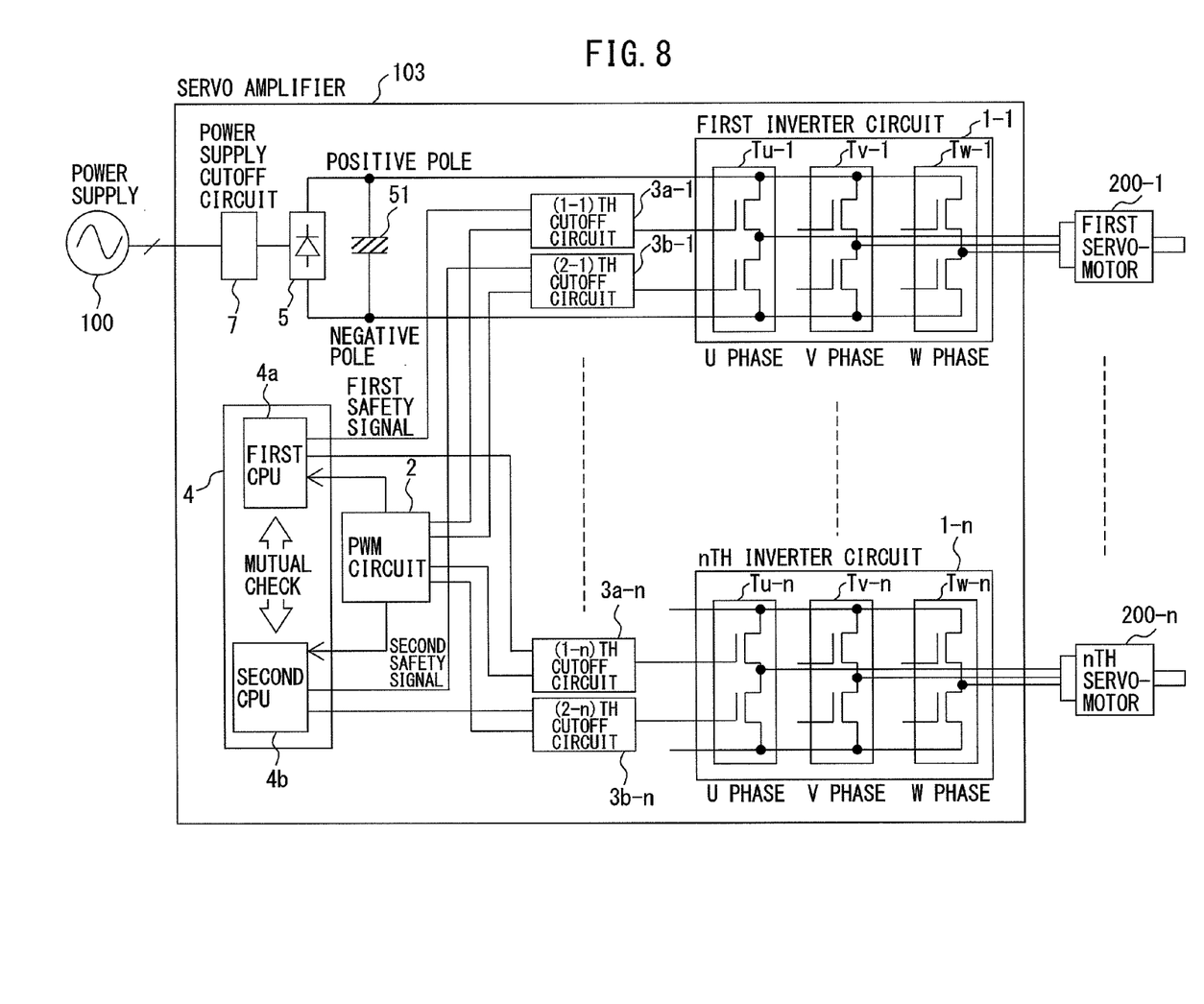
FIG. 8 is a configuration diagram of a servomotor control device according to a third embodiment of the present invention.

Next, a servomotor control device according to a third embodiment of the present invention will be described. FIG. 8 illustrates a configuration diagram of the servomotor control device according to the third embodiment of the present invention. A servomotor control device 103 according to the third embodiment of the present invention includes: a converter 5 that converts alternate current to direct current and supplies the direct current obtained by the conversion to an inverter circuit; and a power supply cutoff circuit 7 that cuts off a connection between a power supply 100 that supplies alternate current to the converter and the converter, wherein the servomotor control circuit 4 detects an output voltage of the converter 5 and determines, on the basis of the detection result, whether the power supply cutoff circuit 7 is normal; and turns off outputs of safety signals to all of the cutoff circuits 3a and 3b and cuts off the power supply cutoff circuit 7 when detecting an abnormality of the cutoff circuit 3a or 3b, or the power supply cutoff circuit 7. The configuration of other components of the servomotor control device according to the third embodiment is substantially the same as the configuration of the servomotor control device according to the first embodiment, and therefore detailed description thereof will be omitted.

The servomotor control device 103 according to the third embodiment includes the power supply cutoff circuit 7, instead of the electromagnetic contactor 6 in the servomotor control device 102 according to the second embodiment.

The servomotor control device according to the third embodiment of the present invention makes it possible to further enhance reliability by disposing the power supply cutoff circuit 7 in a power supply source and cutting off these at the same time at an alarm detection time.

Fourth Embodiment

Figure 9:
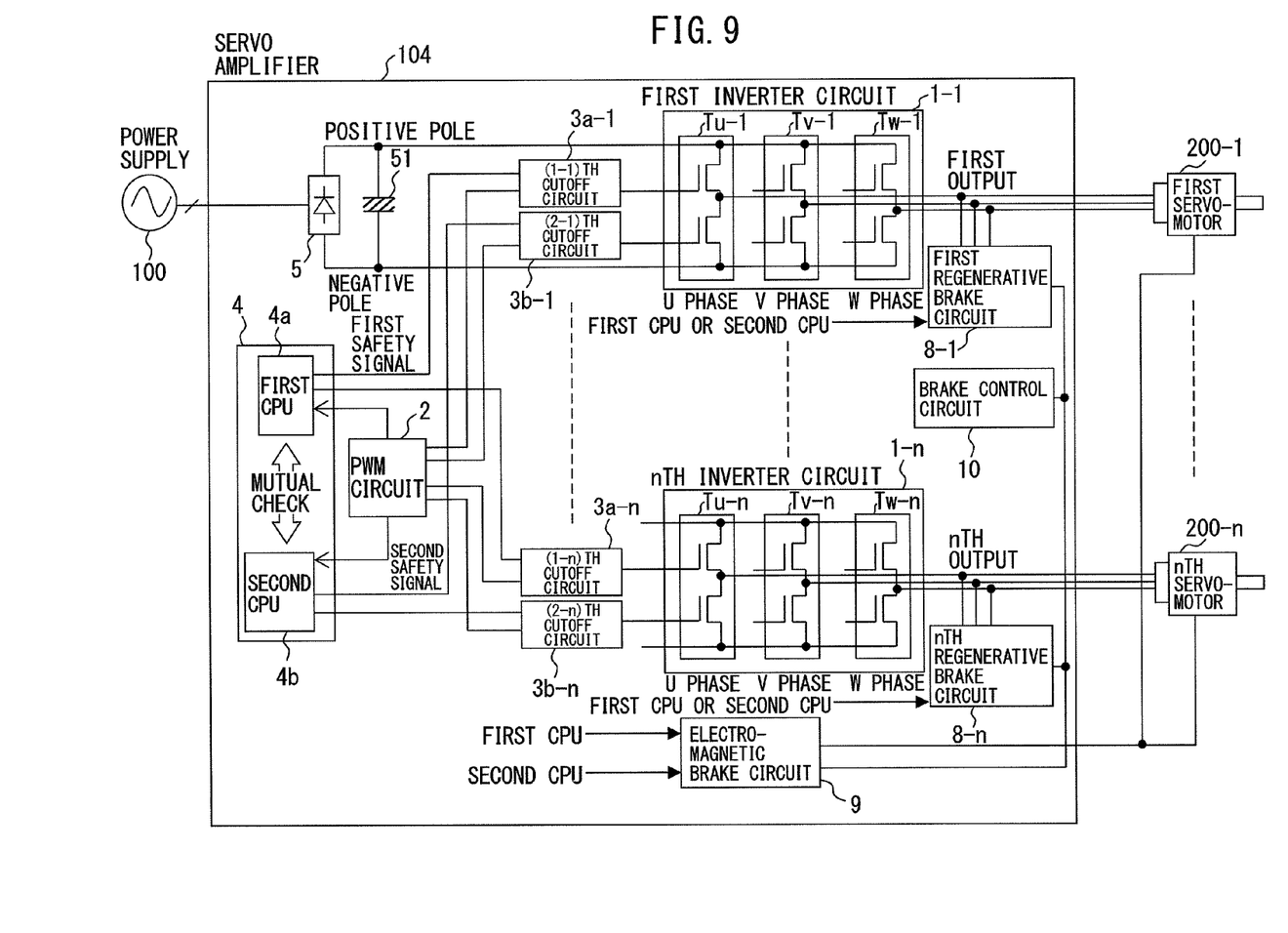
FIG. 9 is a configuration diagram of a servomotor control device according to a fourth embodiment of the present invention.

Next, a servomotor control device according to a fourth embodiment of the present invention will be described. FIG. 9 illustrates a configuration diagram of the servomotor control device according to the fourth embodiment of the present invention. A servomotor control device 104 according to the fourth embodiment of the present invention further includes a brake control circuit 10 that controls a regenerative brake (8-1, . . . , 8-n) or an electromagnetic brake 9 that stops a servomotor (200-1, . . . , 200-n), wherein the servomotor control circuit 4 stops the servomotor (200-1, . . . , 200-n) by activating the regenerative brake (8-1, . . . , 8-n) or the electromagnetic brake 9 when turning off outputs of safety signals to all of the cutoff circuits. The configuration of other components of the servomotor control device according to the fourth embodiment is substantially the same as the configuration of the servomotor control device according to the first embodiment, and therefore detailed description thereof will be omitted.

A first regenerative brake circuit 8-1 is disposed in a first output of the first inverter circuit 1-1 and is controlled by a signal from the first CPU 4a or the second CPU 4b.

An nth regenerative brake circuit 8-n is disposed in an nth output of the nth inverter circuit 1-n and is controlled by a signal from the first CPU 4a or the second CPU 4b.

The electromagnetic brake circuit 9 is connected with a first servomotor 200-1 to an nth servomotor 200-n and is controlled by a signal from the first CPU 4a or the second CPU 4b.

The servomotor control device according to the fourth embodiment of the present invention makes it possible to safely stop the servomotors 200-1, . . . , and 200-n by turning off the outputs of all of the inverter circuits 1-1, . . . , and 1-n and activating the regenerative brakes 8-1, . . . , and 8-n or the electromagnetic brake 9 at an alarm stop time or an emergency stop time, respectively.

As described above, the servomotor control device according to one embodiment of the present invention makes it possible to provide a servomotor control device that enables a power cutoff circuit to be periodically tested during PWM control, i.e., servomotor operation.

What is claimed is:

1. A servomotor control device comprising:
an inverter circuit configured to drive a servomotor by converting direct current to alternate current and supplying the alternate current obtained by the conversion to the servomotor;
a pulse width modulation circuit configured to output a pulse width modulation signal to the inverter circuit;
a cutoff circuit configured to receive a safety signal and the pulse width modulation signal, outputs the pulse width modulation signal to the inverter circuit when the safety signal is turned on, and does not output the pulse width modulation signal to the inverter circuit when the safely signal is turned off; and
a servomotor control circuit configured to output the safety signal to the cutoff circuit and receives a monitor signal output from the cutoff circuit,
wherein the servomotor control circuit turns off, within one cycle time of the pulse width modulation signal, the safety signal input to the cutoff circuit where the pulse width modulation signal is turned off during servomotor drive and detects an abnormality when an off state is not detected using the monitor signal.

2. The servomotor control device according to claim 1, comprising: a plurality of the cutoff circuits;
and a plurality of the safety signals input to the plurality of the cutoff circuits, respectively, a plurality of the pulse width modulation signals input to the plurality of the cutoff circuits, respectively, and a plurality of monitor signals output from the cutoff circuits, respectively, wherein
the servomotor control circuit, when detecting the abnormality, stops the servomotor by turning off outputs of the safety signals to all of the cutoff circuits.

3. The servomotor control device according to claim 1, wherein
the servomotor control circuit comprises a first servomotor control circuit and a second servomotor control circuit,
the servomotor control circuit stopping a servomotor by turning off, when it is determined that a first safety signal output by the first servomotor control circuit and a second safety signal output by the second servomotor control circuit are not in the same state for at least one cycle time of the pulse width modulation signal, outputs of the first safety signal and the second safety signal to all of the cutoff circuits.

4. The servomotor control device according to claim 1, comprising:
a converter that converts alternate current to direct current and supplies the direct current obtained by the conversion to the inverter circuit; and
an electromagnetic contactor including an auxiliary contact that is mechanically interlocked with a main contact that cuts off a connection between a power supply that supplies alternate current to the converter and the converter, wherein
the servomotor control circuit detects a state of the auxiliary contact and determines whether the electromagnetic contactor is normal; and turns off outputs of the safety signals to all of the cutoff circuits and cuts off the electromagnetic contactor when detecting an abnormality of the cutoff circuit or the electromagnetic contactor.

5. The servomotor control device according to claim 1, comprising:
a converter that converts alternate current to direct current and supplies the direct current obtained by the conversion to the inverter circuit; and
a power supply cutoff circuit that cuts off a connection between a power supply that supplies alternate current to the converter and the converter, wherein the servomotor control circuit detects an output voltage of the converter and determines, on the basis of the detection result, whether the power supply cutoff circuit is normal; and turns off outputs of the safety signals to all of the cutoff circuits and cuts off the power supply cutoff circuit when detecting an abnormality of the cutoff circuit or the power supply cutoff circuit.

6. The servomotor control device according to claim 1, further comprising a brake control circuit that controls a regenerative brake or an electromagnetic brake that stops the servomotor, wherein the servomotor control circuit stops the servomotor by activating the regenerative brake or the electromagnetic brake when turning off outputs of the safety signals to all of the cutoff circuits.

\* \* \* \* \*